March 14, 1961 R. H. VERGARA 2,974,988
SWIVEL BRACE UNIT FOR DOORS OF CARGO CONTAINERS
AND OF TRAILER-TRUCK BODIES
Filed Sept. 8, 1959 2 Sheets-Sheet 1
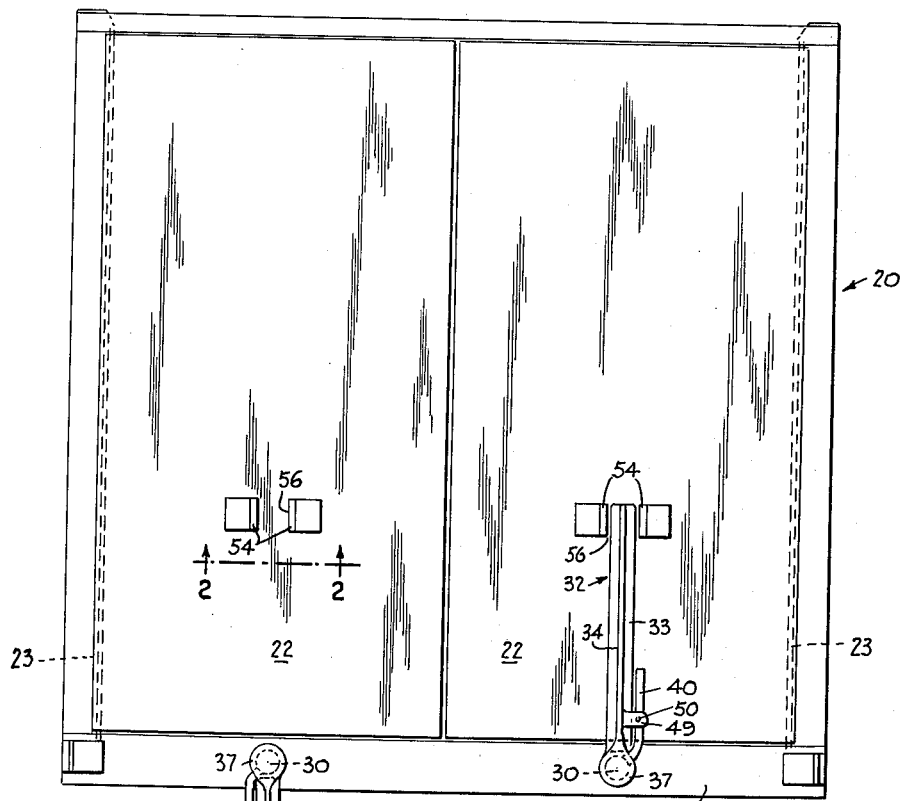
FIG.1.
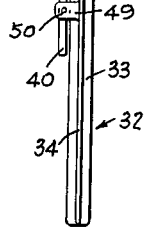
FIG.4.
FIG.3.
FIG.5. FIG.6.
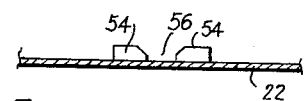
FIG.2.
INVENTOR.
RICARDO H. VERGARA
BY
ATTORNEY.

March 14, 1961 R. H. VERGARA 2,974,988
SWIVEL BRACE UNIT FOR DOORS OF CARGO CONTAINERS
AND OF TRAILER-TRUCK BODIES
Filed Sept. 8, 1959 2 Sheets-Sheet 2
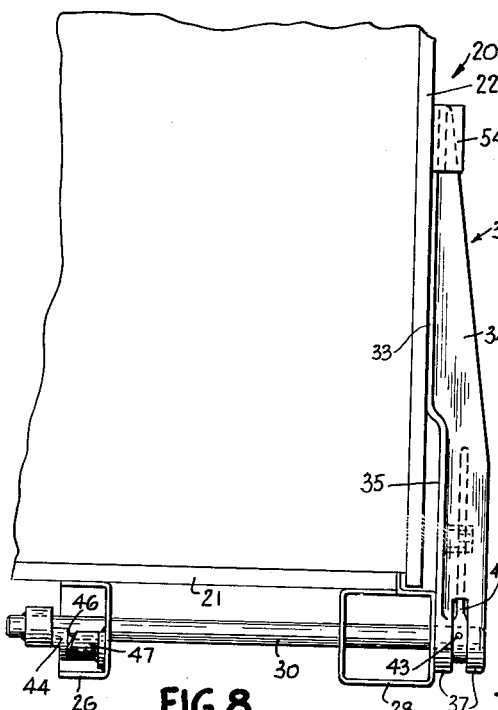
FIG.8.
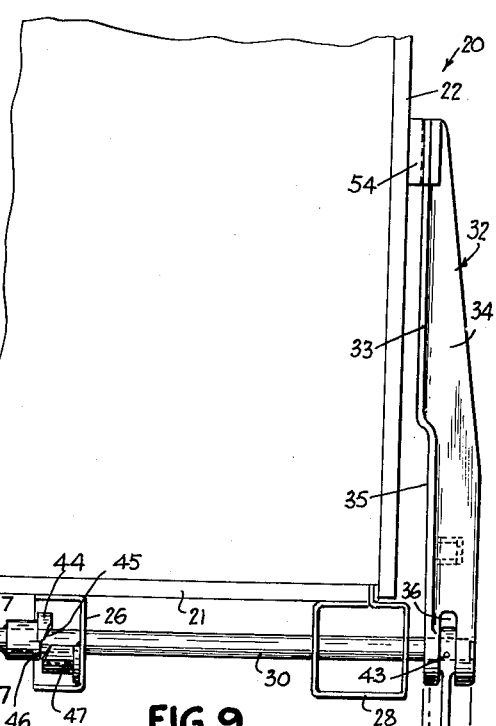
FIG.9.
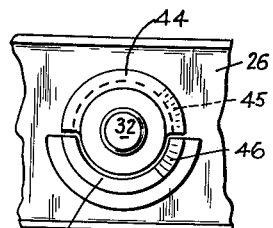
FIG.7.
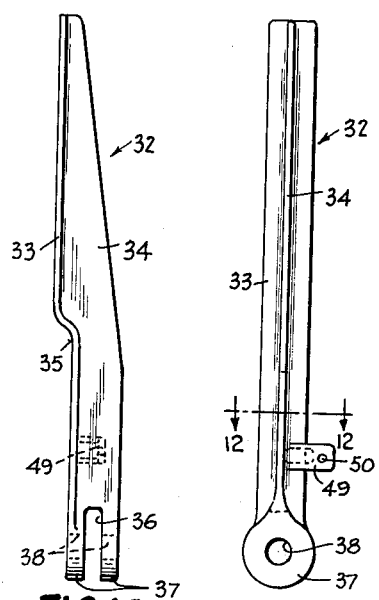
FIG.10. FIG.11.
FIG.13. FIG.14.
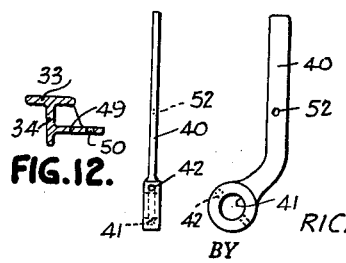
FIG.12.
INVENTOR.
RICARDO H. VERGARA
BY
Percy Freeman
ATTORNEY.

United States Patent Office 2,974,988
Patented Mar. 14, 1961

2,974,988

SWIVEL BRACE UNIT FOR DOORS OF CARGO CONTAINERS AND OF TRAILER-TRUCK BODIES

Ricardo H. Vergara, Long Island City, N.Y., assignor to Ward La France Truck Corp., Elmira, N.Y., a corporation of New York Filed Sept. 8, 1959, Ser. No. 838,686

3 Claims. (Cl. 292—257)

This invention relates to closures and, more particularly, to a reinforcement unit for doors of cargo containers and of trailer truck bodies, etc.

Ordinarily, such doors are secured in a closed position by means of hinges, latches, door operators, and the like, which exert the sustaining or retaining force upon peripheral portions thereof. In cargo handling equipment, such as containers, truck bodies, storage compartments, and the like, such closures are usually subjected to great stresses, which stresses are necessarily transmitted to the peripheral portions of the door, having the associated closure means for retaining the doors in the closed position. As a result, such closures frequently become warped, distorted, or forced out of proper alignment with the cooperating closure parts, thus necessitating expensive and time-consuming repairs, replacement of parts, and the like. It is, therefore, an object of the present invention to provide a door reinforcement assembly that will provide an effective retaining force upon the door for securing the door in a closed position, at the central portions thereof which will overcome the aforementioned difficulties.

Another object of the present invention is to provide a door reinforcement assembly that includes a pressure member that exerts a restraining force upon a central portion of a closure to remove some of the stress ordinarily applied to the peripheral portions thereof, thus relieving the closure of otherwise distorting stresses.

A further object of the present invention is to provide a door reinforcement assembly of the type described that includes mechanical advantage means for enabling the pressure member to transmit a substantially great holding force to the central portion of the door that can be conveniently operated by a single individual.

Still another object of the present invention is to provide a door reinforcement assembly of the above type that can be conveniently applied to existing truck bodies, storage receptacles, and other cargo handling, transporting, and storage units without interfering with any of the other operating parts thereof.

All of the foregoing and still further objects and advantages of this invention will become apparent from a study of the following specification, taken in connection with the accompanying drawing, wherein:

Fig. 1 is a rear elevational view of a cargo storage and transporting unit, such as a truck body, embodying a door reinforcement assembly made in accordance with the present invention.

Fig. 2 is a fragmentary cross-sectional view taken along line 2—2 of Fig. 1.

Fig. 3 is a front elevational view of a cam member forming a part of a mechanical advantage device of the present invention.

Fig. 4 is a top view of the cam shown in Fig. 3.

Fig. 5 is a front elevational view of another cam element forming a part of the present invention.

Fig. 6 is a side elevational view of the cam shown in Fig. 5.

Fig. 7 is an end view taken along line 7—7 of Fig. 9.

Fig. 8 is a fragmentary side elevational view of the unit shown in Fig. 1 with the pressure member in abutting pressure engagement with the closure.

Fig. 9 is a view similar to Fig. 8, showing the parts in an adjusted released position, illustrating the manner in which the pressure member is rotated out of blocking engagement with the closure.

Fig. 10 is a side elevational view of the pressure member forming a part of the present invention.

Fig. 11 is a front elevational view of the device shown in Fig. 10.

Fig. 12 is a cross-sectional view taken along line 12—12 of Fig. 11.

Fig. 13 is a side elevational view of an operating lever forming another part of the present invention.

Fig. 14 is a front elevational view of the operating lever shown in Fig. 13.

Referring now to the drawing, and more particularly to Fig. 1 thereof, a door reinforcement assembly made in accordance with the present invention is shown in operative association with a truck body 20 having an underframe 21 and a pair of rear doors 22 that are rotatably mounted upon side hinge pins 23 for selective movement rearwardly and outwardly toward an open position.

As is more clearly shown in Figs. 8 and 9 of the drawing, a bracket 26 is secured beneath the underframe 21 of the truck body 20 and rotatably supports one end of a longitudinally extending shaft 30, the opposite end of which is rotatably received within the reinforced rear sill 28 of the underframe. A pressure member 32 is rotatably supported upon the rear terminal end of the shaft 30 for selective rotation within a plane substantially parallel to the plane of the rear doors 22, for purposes hereinafter more fully described.

As is more clearly shown in Figs. 10 and 11 of the drawing, each pressure arm 32 includes a substantially flat bearing flange 33 for pressure engagement with the door to be secured, and a perpendicularly extending web 34 which is bifurcated at one lower end to provide a slot 36 that extends between a pair of bearing arms 37. Both of the bearing arms 37 have enlarged aligned bores 38 that rotatably receive the aforementioned terminal portion of the shaft 30 therewithin. An offset portion 35 is also provided for clearing abutting parts of the truck body during rotation of the bearing arm member 32 between selected positions.

An operating lever 40 has a bearing portion at one end that is received within the bifurcated slot 36 of the pressure arm 32, which end of the operating lever 40 is provided with a central bore 41 that receives the adjacent end of the operating shaft 30 therethrough. A diametrically extending bore 42 in the bearing end of the operating lever 40 slidably receives a lock pin 43 that is also driven through the operating shaft 30 so as to secure the operating lever 40 in radially outwardly extending position upon the shaft 30 for rotation therewith. Thus, while the operating lever 40 is secured to the shaft 30, the pressure arm member 32 may be selectively rotated about the shaft 30 relative to the arm 40, in a direction away from abutment with the operating lever. In the completely engaged position, however, an outwardly extending latch plate 49 integral with the central portion of the web 34 of the pressure arm member 32 has an opening 50 that is in alignment with a corresponding opening 52 in the operating lever 40, so as to receive a latch pin or lock therethrough, to prevent rotation of either the operating lever 40 or the pressure arm 32 out of a secured position.

A cam member 47 is fixed upon the bracket 26 carried by the underframe and includes a cam surface 46 that faces forwardly into confronting engagement with another cam surface 45 of a second cam 44 that is secured to the opposite front end of the operating shaft 30. While both of the cam surfaces 45, 46, include an inclined surface portion, it is necessary that at least one of such cam elements be provided with a bearing surface that is inclined to the longitudinal axis of the operating shaft 30, whereupon rotation of the operating shaft 30, the sliding engagement between the inclined cam surfaces will effect longitudinal movement of the shaft 30 relative to the supporting bracket 26 and rear sill 28.

Each door 22 may be provided with a pair of positioning lugs 54 that define a central recess 56 for positioning the free end of each pressure arm member 32 when rotated into the operative position illustrated in connection with the right hand door of the truck body 20 shown in Fig. 1. With the operating lever 40 rotated into the downwardly disposed position illustrated in Fig. 9, the pressure arm member 32 may be rotated from the downwardly extended broken line position to the raised full line position of Fig. 9, following which rotation of the operating lever 40 upwardly into the broken line position shown in Fig. 8, will cause the operating shaft 30 to be drawn forwardly by the action of the cam members 44, 47, so as to urge the free end of the pressure arm member 32 into the pressure abutting engagement with the door member 22 shown in Fig. 8. In the operative position shown in Fig. 8, the pressure arm member 32 exerts an inward pressure upon the door 22 thus relieving the hinge and other latch elements thereof from excessive stress or strain ordinarily distorting and damaging the same. As the pressure arm member 32 acts against a central portion of each door, the peripheral or marginal portions of the door are relieved of these excessive stresses, thus preventing the cargo from forcing the doors open during the transport thereof, and otherwise sustaining and ordinary or unusual forces imposed upon the operating parts of the door.

Whenever desired, the pressure arm member 32 may be removed from the locked position shown in Fig. 8, simply by manually rotating the operating lever 40 from the raised to the lowered position shown, and then disengaging the free end of the operating arm member 32 from the positioning lugs 54, and rotating the operating arm member downwardly to allow the doors to open.

While this invention has been described with particular reference to the construction shown in the drawing, it is to be understood that such is not to be construed as imparting limitations upon the invention, which is best defined by the claims appended hereto.

Having thus described my invention, what I claim as new and desire to secure by Letters Patent is:

1. A door reinforcement device comprising, in combination, a pressure member, a shaft supporting said pressure member for selective movement into confronting relationship with the outside of a door, and mechanical advantage means for driving said pressure member axially into pressure abutment with the outside of the door to resist outward displacement thereof, and comprising bracket means slidably supporting said shaft for movement in a direction normal to the door being reinforced, and said pressure member having one end rotably carried upon said shaft for pivotal movement in a plane substantially parallel to the plane of the door being reinforced, said mechanical advantage means comprising a first cam carried by said bracket means, a second cam carried by said shaft in sliding engagement with said first cam, rotation of said shaft at said second cam relative to said first cam effecting longitudinal movement of said shaft and said pressure member, and manually operated means for rotating said shaft, said first cam rotatably receiving said shaft therethrough intermediate said second cam and said pressure member; said manually operated means comprising a lever secured at one end to said shaft and extending radially outwardly therefrom, said one end of said pressure member comprising a pair of bifurcated bearing portions defining a radially outwardly extending slot therebetween, and said one end of said lever comprising a bearing portion fixed to said shaft within said slot of said pressure member and between said bearing portions thereof.

2. A door reinforcement device as set forth in claim 1, further comprising a pair of positioning lugs for securement upon the door to be reinforced, said lugs being laterally spaced apart to receive the opopsite end of said pressure member therewithin.

3. A door reinforcement device as set forth in claim 1, wherein at least one of said first and second cams includes an operating surface inclined to the longitudinal axis of said shaft.

References Cited in the file of this patent
UNITED STATES PATENTS

| | | |
|---|---|---|
| 975,528 | Hynd | Nov. 15, 1910 |
| 1,739,911 | McMurray | Dec. 17, 1929 |

FOREIGN PATENTS

| | | |
|---|---|---|
| 114,415 | Austria | Oct. 10, 1929 |